(No Model.)
A. F. DUVALL.
HAME CLIP.
No. 369,635. Patented Sept. 6, 1887.
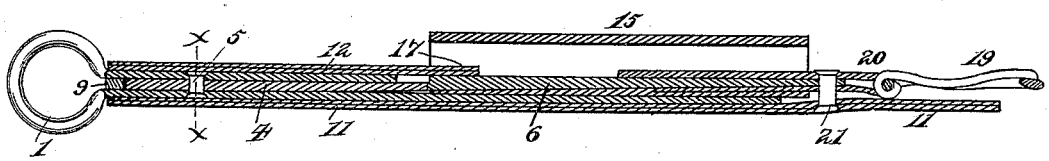
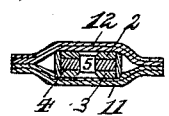
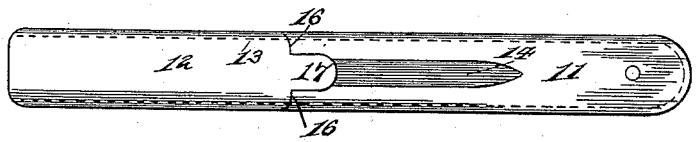
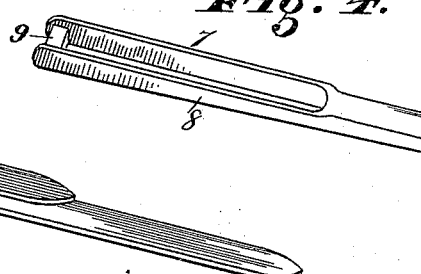
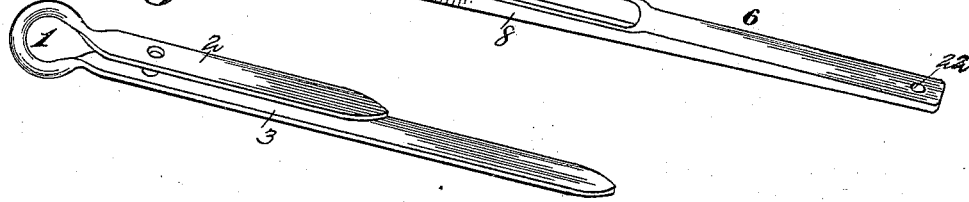
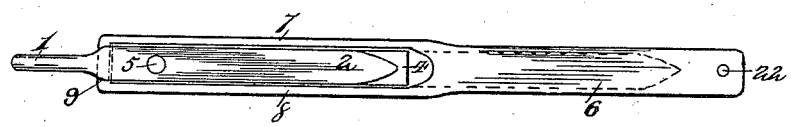
Attest
J. Watson Sims
Otto Engel
Inventor
Anthony F. Duvall
by Wood & Boyd
his Attorneys &c
N. PETERS, Photo-Lithographer, Washington, D. C.

UNITED STATES PATENT OFFICE.

ANTHONY F. DUVALL, OF CINCINNATI, OHIO, ASSIGNOR TO PERKINS, CAMPBELL & CO., OF SAME PLACE.

HAME-CLIP.

SPECIFICATION forming part of Letters Patent No. 369,635, dated September 6, 1887.

Application filed July 23, 1887. Serial No. 245,116. (No model.)

*To all whom it may concern:*

Be it known that I, ANTHONY F. DUVALL, of Cincinnati, in the county of Hamilton and State of Ohio, have invented certain new and useful Improvements in Hame-Clip Attachments, of which the following is a specification.

The object of my invention is to provide a stiffening-shank attachment to the ordinary hame-clip for securing it to the casing-box loop in a cheap and durable manner. Various features of my invention are shown in the drawings making a part of this specification, in which—

Figure 1 is a longitudinal section of my improvement. Fig. 2 is a section on line $x\ x$, Fig. 1. Fig. 3 is a top plan view of the fastening-case. Fig. 4 is a perspective view of the clip attachment. Fig. 5 is a perspective view of the hame-clip. Fig. 6 is a plan view of the parts shown in Figs. 4 and 5, connected together in position for inserting into the fastening-case, Fig. 3.

1 represents the eye of the ordinary clip; 2, the top arm; 3, the bottom arm, which is preferably extended longer for stiffening.

4 represents a leather filling inserted between the forks 2 and 3, and secured thereto by rivet 5.

6 represents the shank of the clip attachment. It is shown as slotted or bifurcated, forming two forks, 7 and 8, which are outside of the plane of the clip. (Shown in Fig. 6.)

9 represents a cross-bar rigidly connecting the forks 7 and 8 together. This bar passes between the shank of the clips and rests against the filling-piece 4. (Shown in Figs. 1 and 6.)

The fastening-case shown in Fig. 3 is formed of top and bottom sections, 11 and 12, united together by stitches 13. The top and bottom portions, 11 and 12, are preferably each made of two pieces of leather. The lower part, 11, is cut out, forming a groove, 14, to receive the extended end of fork 3.

The clip with its attachment, as shown in Fig. 6, is inserted in the channel formed between the top and bottom of the casing attachment, as shown in Figs. 1 and 2.

15 represents a box-loop, which is inserted between the shank 6 and clip 3 and pressed back until it rests against the shoulders 16 of the fastening-case.

17 represents a tongue, which is an extension of the top 12. It projects into the box-loop, as shown in Fig. 1, so as to form a finish.

The filling-piece and shoulders 16 furnish a firm stop for the box-loop to rest against.

19 represents the buckle, which is secured to the fastening-case by a loop, 20, engaging upon each side of the shank 6. These parts are secured together by rivet 21, which passes through loop 20, eye 22 of shank 6, and the bottom section, 11, of the fastening-case, which completes the construction.

Having described my invention, what I claim is—

1. In combination with a hame-clip, the filling-piece 4, and the attaching piece formed with the parts 6 7 8 9, substantially as specified.

2. In combination with the hame-clip, its attachment, the casing 11 12, having the recess *a* to receive clip and attachment, the box-loop 15, and buckle 19, said parts being connected together by rivets 5 and 21, substantially as specified.

In testimony whereof I have hereunto set my hand.

ANTHONY F. DUVALL.

Witnesses:
ROBERT ZAHNER,
J. WATSON SIMS.